United States Patent
Gray et al.

(10) Patent No.: US 7,764,632 B2
(45) Date of Patent: Jul. 27, 2010

(54) SOFTWARE BRIDGE FOR MULTI-POINT MULTI-MEDIA TELECONFERENCING AND TELECOLLABORATION

(75) Inventors: Joseph Gray, Yavne (IL); Haim Karniely, Holon (IL)

(73) Assignee: Interwise Ltd., Airport (IL)

( * ) Notice: Subject to any disclaimer, the term of this patent is extended or adjusted under 35 U.S.C. 154(b) by 913 days.

(21) Appl. No.: 11/509,253

(22) Filed: Aug. 24, 2006

(65) Prior Publication Data

US 2008/0112336 A1 May 15, 2008

(51) Int. Cl.
*H04L 12/18* (2006.01)

(52) U.S. Cl. .................. 370/260; 370/261; 370/262

(58) Field of Classification Search ......... 370/260–261, 370/262
See application file for complete search history.

(56) References Cited

U.S. PATENT DOCUMENTS

| | | | |
|---|---|---|---|
| 6,564,261 B1 * | 5/2003 | Gudjonsson et al. | 709/227 |
| 6,584,076 B1 * | 6/2003 | Aravamudan et al. | 370/260 |
| 6,978,001 B1 * | 12/2005 | Shaffer et al. | 379/202.01 |
| 6,993,497 B2 * | 1/2006 | Yeh et al. | 705/14 |
| 7,103,644 B1 * | 9/2006 | Zhang et al. | 709/219 |
| 7,151,753 B2 * | 12/2006 | Chaney et al. | 370/261 |
| 7,184,415 B2 * | 2/2007 | Chaney et al. | 370/260 |
| 7,184,531 B2 * | 2/2007 | Crouch | 379/202.01 |
| 7,215,752 B2 * | 5/2007 | Raniere et al. | 379/202.01 |
| 7,394,896 B2 * | 7/2008 | Norton | 379/202.01 |
| 7,426,191 B2 * | 9/2008 | Salesky et al. | 370/260 |
| 7,450,149 B2 * | 11/2008 | Drell et al. | 348/14.08 |
| 7,458,084 B2 * | 11/2008 | Zhang et al. | 719/328 |
| 7,505,574 B2 * | 3/2009 | O'Brien et al. | 379/202.01 |
| 7,532,713 B2 * | 5/2009 | Norton | 379/202.01 |
| 2004/0111472 A1 * | 6/2004 | Swanson et al. | 709/204 |
| 2006/0088152 A1 * | 4/2006 | Green et al. | 379/202.01 |
| 2006/0104221 A1 * | 5/2006 | Norton | 370/261 |
| 2007/0266077 A1 * | 11/2007 | Wengrovitz | 709/203 |

* cited by examiner

*Primary Examiner*—Daniel J Ryman
*Assistant Examiner*—Jay P Patel
(74) *Attorney, Agent, or Firm*—Greenblum & Bernstein, P.L.C.

(57) ABSTRACT

A multimedia bridge which enables enterprise-class voice, Web, and video teleconferencing. The multimedia bridge is a distributed media server architecture that efficiently routes, bridges, manages integrated voice, data and video streams across multiple sites in real-time. The multimedia bridge includes media services, session control, content distribution and any-device access layer.

2 Claims, 5 Drawing Sheets

SOFTWARE BRIDGE FOR MULTI-POINT MULTI-MEDIA TELECONFERENCING AND TELECOLLABORATION

BACKGROUND OF THE INVENTION

1. Field of the Invention

The present invention relates generally to multimedia conferencing and more specifically to a distributed software bridge supporting a multimedia conferencing and collaboration apparatus. The apparatus provides for multi-point multimedia, multi-participatory virtual meetings realized through industry-standard communication, computing, and switching hardware means and managed, monitored, protected and controlled by software means.

2. Discussion of the Related Art

In today's global multi-national business world it is not always possible or even desirable to convene a meeting in which persons from many different geographical locations are physically present in one place. It is more productive to look for cost-efficient alternatives, such as teleconferencing. For the most demanding teleconferencing applications requiring multimedia content and resources, advanced video conferencing and web conferencing solutions are available. A conference call is an efficient, inexpensive way to gather individuals and groups from multiple different locations together in a virtual meeting to converse in an orderly manner using standard communications technology. Conference calls have many common business applications, serving as a medium for staff meetings, training sessions, consultation, crisis management and more. Companies in various different industries benefit from audio conferencing. In the financial industry, for instance, corporations and investment banks commonly use conference calls for earnings releases, investor relations and stockholder meetings, as well as for the timely release of critical information through analyst calls. In sales and marketing, conference calls are an efficient medium for exchanging information on orders and pricing, forecasting industry trends and making new product announcements. Public relations firms use conference calls to make corporate announcements, issue promotional reviews and news releases and announce special events and programs. Companies in these and many other industries have recognized the benefits of using conference calls: improved communication, better dissemination of information, reduced travel costs and increased productivity.

In the field of communications, a bridge is a micro-processor controlled device which has a multiplicity of parts that can be interconnected in a variety of ways for connecting multiple telephone lines to each other. Bridges are often used to establish multi-party conference calls. As the demand for conference call services increases, improvements are needed in the flexibility, responsiveness and data carrying capability of the service. A bridge may include any number of parts which can service many calls. Currently operating conferencing systems are typically supported via hardware based conference bridges with some of the systems allowing for software-controlled bridges. Bridges are assigned to and support a conference in a non-flexible manner such that once a bridge is assigned it remains associated with the conference until the conference is terminated. As a result the number of conference participants should be determined in advance and the load on the allocated bridge is typically pre-determined. A bridge designed in such a manner does not enable dynamic bandwidth allocation during multi-participant meetings. Bridge load capacity inefficiency and bandwidth limitation makes video conferencing and multi-media conferencing difficult. Existing bridges typically support either only Personal Computer (PC) audio or phone audio but not a mixed session where some of the participants speak using a PC and others using a phone.

It would be easily perceived by one with ordinary skills in the art that in order to provide for efficient real-time multimedia multi-point teleconferencing, there is a need for a new type of conference bridge that will provide for real-time bridging, real-time data distribution, dynamic in-conference load allocation, and substantially reduced bandwidth requirements.

SUMMARY OF THE PRESENT INVENTION

The present invention describes a bridge for enabling a teleconference for telecollaboration event between two or more participants. The participants are connected to two or more servers. The servers cooperate in order to support efficient multi-media multi-point event. One or more of the servers can be a hosting server and one or more other servers can be on-premise servers, wherein each server is connected to an at least one other server, and each participant device is connected to one server. The participants can use any phone, or any computing platform, or a combination thereof.

In accordance with a preferred embodiment, there is thus provided in a distributed teleconferencing system operating in a data communication network, a bridge apparatus for bridging and routing one or more integrated data streams, the software bridge comprising two or more communication servers connected to the data communications network, the communication servers perform cooperatively for bridging of audio, video and data streams and applicative data distributing during a teleconferencing or telecollaboration event between two or more participants. Optionally, the bridge is a software bridge. One or more of the at least two communication servers can be connected to one or more client devices. Optionally, one or more additional communication servers connect to any of the at least two communication servers. Additional communication servers can be automatically added or removed dynamically during an event. Within the bridge, an at least one communication server can be located within an organization, and an at least one communication server can be located in public network. The integrated data stream can comprise audio data, video data or digital data. Within the bridge, a first participant is optionally connected a first communication server during the teleconferencing or telecollaboration event, and a second participant is optionally connected a second communication server during teleconferencing or telecollaboration event. Optionally, one participant is using a telephony device to connect to the teleconferencing or telecollaboration event, wherein the telephony device is linked to one of the communication servers via an Internet Protocol gateway and a private branch exchange. Optionally, one or more of the communication servers comprise a telephony server for connecting a telephony device to the communication server. Within the bridge, one participant is optionally using a computing device to connect to the teleconferencing or telecollaboration event. Within the bridge, a computing device and a telephony device are optionally connected to the teleconferencing or telecollaboration event, and wherein the computing device issues a mute command or an unmute command to the telephony device. Optionally, a first participant using a telephony device calls a first communication server of the at least two communication servers, and a second participant using a telephony device calls a second communication server of the at least two communication servers. The bridge apparatus can further comprise one or more server manager connected to the data communications network, for managing and controlling the communication servers. Optionally, the communication servers are linked to a communication center installed on a computing platform for managing and controlling the teleconferencing and telecollaboration event. Within the bridge apparatus, the communicative servers can be distributed across the data communications network. The data communications network is optionally the Internet. Optionally one or more of the communication servers includes a materials server component for providing applicative materials to a participant client device; a conferencing data multiplexer and distribution component for receiving one or more conferencing and collaboration data streams from one or more client devices, or from one or more communications servers and forwarding a data stream to a client device or to a communications server; and a telephony component for handling and connecting telephony devices to the teleconferencing and telecollaboration event. Optionally, the conferencing data multiplexer and distribution component also mixes the streams into a single mixed data stream. The sent data stream can be the single mixed data stream or one or more of the received conferencing and collaboration data streams.

Another aspect of the disclosed invention discloses in a teleconferencing system a bridging method for cooperatively routing integrated data streams during a teleconferencing and telecollaboration event, the cooperative bridging method comprising: creating a conferencing or collaboration event on a communication center by a participant; querying the communication center concerning new teleconferencing or telecollaboration events by a proxy remote controller; notifying the proxy remote controller concerning a new teleconferencing or telecollaboration event by the communication center; assigning the event to the proxy remote controller by the communication center; obtaining a network site tree of available computing and communication platforms for the event from a server manager by the proxy remote controller; selecting a computing and communication platform from each network site by the proxy remote controller using load balancing technology; sending a load request to the proxy agent of all the computing and communications platforms in the network sites tree by the proxy remote controller; receiving an active process load request by a proxy agent of a communication server installed on a main computing platform; receiving a sleeping process load request by an at least one proxy agents of an at least one communication server installed on an at least one other computing and communication platforms; loading an active process of the communication server on the main computing and communications platform by the proxy agent of the communication server; connecting the active process to the proxy remote controller; and sending a process ready command to the proxy remote controller and the multiplexer. The method can further comprise the steps of: loading an at least one of the group consisting of: event ID, proxy remote server IP, proxy remote server port, and proxy remote server version on the communication server installed on the main computing and communications platform; receiving an at least one event parameter, security information, or number of maximum participants by the active process of the communication server from the proxy remote controller; and updating the communication server with event ID, communication server IP or ports list of an active process of the communication server installed on the main computing and communications platform.

Yet another aspect of the disclosed invention relates to an apparatus for supporting one or more virtual meeting between two or more participants using communications and switching devices, the apparatus comprising: two or more client devices for connecting two or more participants to a teleconferencing or telecollaboration event, the client devices receiving, sending or exchanging conferencing data streams there between; two or more conferencing communication servers for receiving data streams from the client devices and for routing the data streams between the client devices, wherein each of the client devices is communicatively connected to one or more of the communication servers. Optionally, the virtual meeting is managed and controlled by software components. The system optionally operates across one or more data communications network. The data communications networks can be any of the following: an IP-based data communications network; or a public switched telephone network. The system can further comprise an IP gateway to allow routing of the data stream across an at least one boundary of the at least one communications network. Optionally, supports distributed participation of the participants being in geographically distributed locations. The at least one data stream can comprise any of the following: a voice data stream; a video data stream; a digital data stream; or a multimedia data stream. Within the system, any of the client devices is optionally one of the following: an analog landline telephone device; a digital landline telephone device; a cellular telephone device; a smart phone device with computing, communications and processing capabilities; a satellite communications telephone device or a computing device with communications capabilities. Within the system, one or more client devices can be telephony devices and one or more client devices can be computing platforms. Further, a computing platform can send one or more mute or unmute commands to a telephony device. Two or more conferencing communication servers can constitute a networked cluster of servers. Within the system, one or more communication server can comprise one or more of the following: an Interactive Voice Response component; a data stream caching component; a data stream multiplexer component for mixing at least two streams into a single data stream or for distributing the mixed data stream or at least one or the at least two data streams to one or more client devices or to one or more servers. The communication server further includes a software component to connect client devices, and/or a routing component for routing one or more data streams to client devices or to other communication servers. The data stream can be a multiplexed data stream. Optionally, load balancing technology is utilized for load balancing communications load between the conferencing communication servers. The load balancing can assign work load to the conferencing communication servers or components such that computing resources are used in an optimal manner. The load balancing can provide high availability by detecting a server failure or a component failure and reconfiguring the system appropriately. Within the system, the communication server can further comprise an IP protocol control component. The teleconferencing or telecollaboration event is a real-time event.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

An apparatus and method for multimedia teleconferencing and telecollaboration that supports multi-point multi-media multi-participatory virtual meetings, is disclosed. The apparatus and method utilize industry-standard communication, computing, and switching hardware means. The virtual meeting, such as a teleconferencing and telecollaboration session or event is set up, managed, monitored, protected and controlled by software. Telecollaboration relates to a cooperation of multiple, possibly remote parties in concurrent working on a task, having a discussion comprising of audio and/or video and/or one or more shared documents or applications, such as a written document, a presentation, instruction codes or any other type of document. Any party can be connected via a telephone of any kind, a computer, or a telephone and a computer.

The proposed teleconferencing and telecollaboration system is supported by a novel enhanced conferencing bridge, preferably implemented as one or more software routines, modules or other components, cooperating to perform the disclosed invention, which will be referred herein after as the softbridge. The multimedia softbridge enables enterprise-class voice, Web (data), and video teleconferencing. The multimedia softbridge is an all-software, distributed media server architecture that efficiently routes, bridges, and manages integrated voice, digital data, video or other multi-media streams across multiple network sites in real-time and supports multiple devices as end points. The multimedia softbridge includes media services, session control, content distribution, and any-device access layer. The multimedia softbridge can leverage current investment in Time Division Multiplexing (TDM) and Internet Protocol (IP) infrastructures of an enterprise to deliver dynamic provisioning of communication servers in real-time for virtually unlimited scalability. A ready addition of communication servers running on industry-standard hardware in order to achieve any capacity requirement is provided. The apparatus provides for high operational availability by providing automatic reconnections and intelligent server selections. As a result, substantially optimal uptime and performance metrics are achieved. Sensitive conferences are made secure as well as data and network applications. Security is achieved via authentication and protection protocols which are integrated with existing security processes and technologies, such as directory services, reverse proxy servers, single sign-on capabilities, encryption, and the like.

Figure 1:
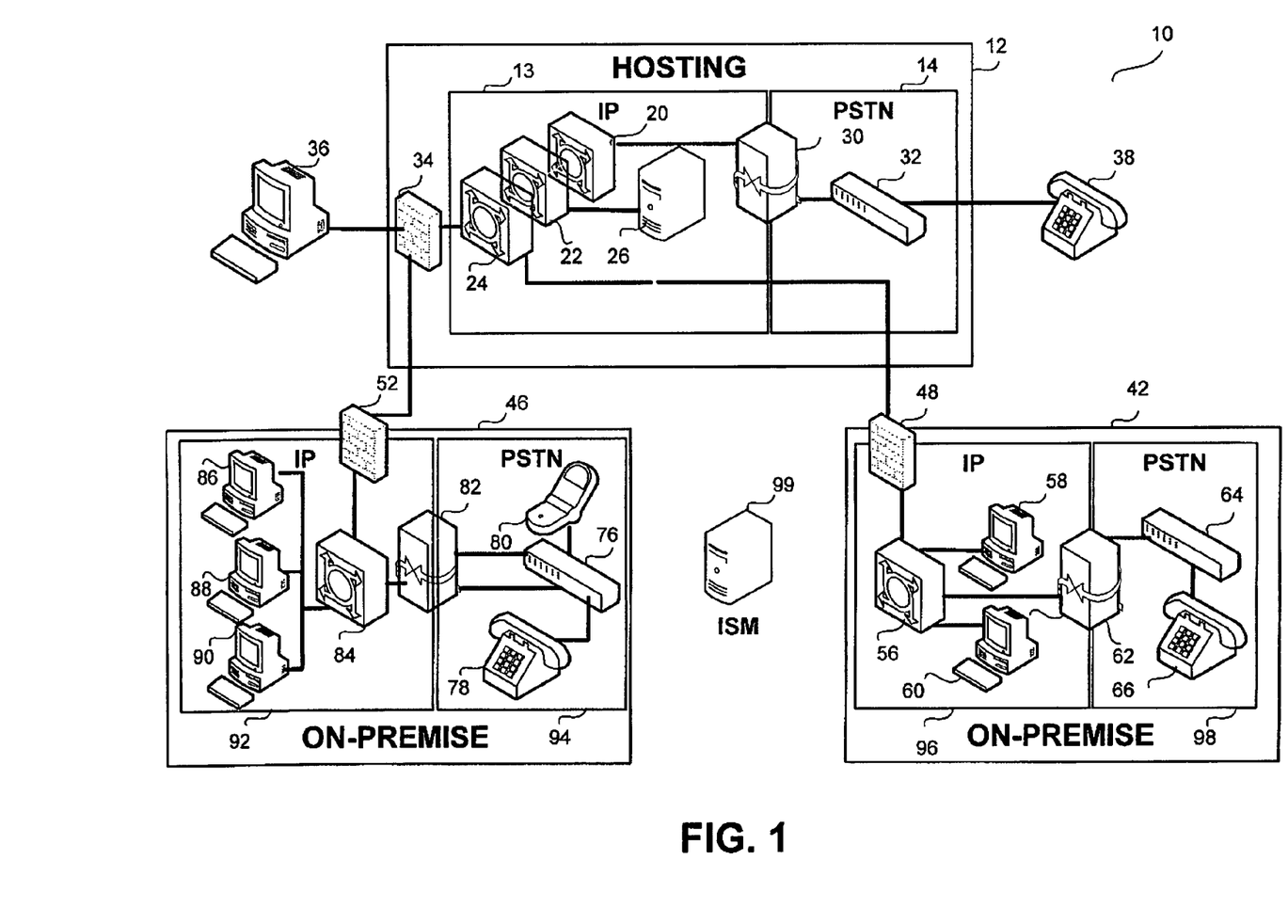
FIG. 1 is a schematic block diagram of the proposed teleconferencing and telecollaboration system, in accordance with a preferred embodiment of the present invention.

Referring to FIG. 1, the proposed teleconferencing and telecollaboration system 10 is shown as comprising a hosting site 12, a first on-premise site 46, and a second on-premise site 42. In some embodiments of the present invention, system 10 does not comprise a hosting site 12, such that the hosting site 12 shown in FIG. 1 is located and operated as part of the first or second on-premise sites 46, 42. The hosting site 12 is linked to the first on-premise site 46 and the second on-premise site 42 respectively by communications links and protected by firewall devices. The present invention is not limited to the number of sites or servers shown in FIG. 1 and those skilled in the art will appreciate that many additional servers at such and other locations can be associated with the present system and invention. Thus, a plurality of hosting sites and on-premise sites can be linked to form the present invention. Likewise a plurality of hosting sites can be linked one to the other to create primary and secondary sites operating in concert to obtain the objectives of the present invention. The hosting site 12 is further linked to a telephony device 38 and a computing and display device 36. Hosting site 12 includes a telephony (PSTN) section 14 and an Internet Protocol (IP) section 13. The PSTN section 14 includes a telephony switch 32 which is communicatively linked in a first direction to the telephony device 38. Telephony switch 32 is linked in a second direction to an Internet Protocol (IP) gateway device 30. The function of the gateway device 30 is to connect the PSTN section 14 to the IP section 13 such as to translate calls received at or from telephony device 38 in a telephony communication format, such as analog or digital sound, to IP format such as data packets carrying digitalized information that reflect the content and characteristics of a telephony call. A further function of IP gateway 30 is to translate IP formatted data packets into telephony formatted analog or digital sounds and send them to the telephony device 38. Specifically, the function of IP gateway 30 is to enable the transferring and handling of telephone calls via an IP-based communications network. In the preferred embodiment of the present invention, the Voice over IP (VoIP) technology is used to transmit the call data via the data communication network. Gateway 30 is connected in the second direction to an IP communication server (ICS) 20. ICS 20 is one server in a cluster of similar servers where the other members of the cluster are ICS 22 and ICS 24. ICS 22 is linked to an IP Communications Center (ICC) 26. ICS 24 is linked to the computing and display device 36 via firewall 34. Firewall 34 is installed between hosting system 12 and device 36 in order to protect system 12 from unauthorized access.

Still referring to FIG. 1 ICS 20, 22, 24, as well as ICS 84 and 56 detailed below, are elements that perform cooperative real time bridging and applicative data distribution during a teleconference or a telecollaboration event. ICS 20, 22, 24 further use as applicative material servers for distributing the materials for the events, such as teleconferences of telecollaboration sessions, prior to or during the event. ICS 20, 22, 24 are preferably applications running on computing platforms such as a network computer, a personal computer, a mainframe computer or the like, that distribute data during an event to all participants in the event, record the events, and update the ICC automatically generated reports. The processes performing the above functionalities are a proxy remote controller referred to as PRC, a proxy agent referred to as PxAgent, a process referred to as Px, a multiplexer process referred to as Mux, a push process, and Upload process referred to as FIUpload. A more detailed description of above processes, their functionality, structure and the forms of interaction within the framework of the proposed conferencing and collaboration system will be provided herein after in conjunction with the following drawings. ICC 26 is the management and control component, which handles administration and maintenance of live events, participants, and servers that are part of the conferencing environment. ICC 26 further enables users to create and register events, view user personal data and schedules, search for specific events, and the like. ICC 26 provides the information for the real time system concerning when events (conferences or collaborative sessions) should occur, different attributes for these events and who may attend them. ICC 26 preferably further comprises one or more web applications that communicate with a database (not shown), and archives recordings and attendance information received from ICS 20, 22, 24, 58 and 84 after the termination of the events. ICC 26 can be further connected to other systems in an organization, such as user management, enterprise management, billing, or the like. An IP Telephony Server (ITS) (not shown) includes a group of components within each of ICS 20, 22, 24, 58 and 84. ITS (not shown) handles connecting telephones, such as telephony device 38, to the disclosed system. Recording is the writing of conference data to a recordings file. The recordings file is uploaded at the end of the event (conference or collaborative session) to the ICC 26. Once the user chooses to playback the recordings, the file is downloaded to the end-point client device operated by the user. The server records only data which is distributed to all participants. The Px saves a reporting data structure for each user. The reporting data structure is updated with every login and logout of the user. At the end of the event the data is written to a text file and the file is uploaded to the ICC 26 via the operation of the Uploader process.

Still referring to FIG. 1, ICS 24 is communicatively linked via firewall 34 to remote on-premise systems, such as first on-premise system 46 and second on-premise system 42. The communications link is established and operates via a data communications network, such as the Internet. On-premise remote system 46 includes a firewall 52, a telephony (PSTN) section 94, and an IP section 92. IP section 92 includes an ICS 84, a first computing and display device 86, a second computing and display device 88, and a third computing and display device 90. ICS 84 is structurally and functionally substantially similar to ICS 20, 22, 24 presented in association with the hosting system 12. Computing and display devices 86, 88, 90 are user-operated devices, such as a Personal Computers (PCs) with communication capabilities. Devices 86, 88, 90 are intermittently linked to ICS 84. ICS 84 is connected to IP gateway device 82 which is structurally and functionally substantially similar or equivalent to IP gateway 30 presented in association with hosting system 12. PSTN section 94 of first on-remise remote system 46 includes a telephony switch 76, a traditional push-button telephony device 78 and a cellular telephony device 80. Device 78 is linkable to switch 76 via a landline, while device 80 is linked to switch 76 either via a cellular communications network (not shown) or through a traditional telephony network (not shown) via a specific gateway device (not shown). Device 78 and device 80 are operated by a user for remote communications purposes. Device 78 and device 80 provide the users with the option of creating, joining to or participating in a teleconference or a telecollaboration session via telephony switch 76, IP gateway 82, ICS 84 and firewall 52. In similar manner devices 86, 88, 90 are operated by users (not shown) and provide the option to the users (not shown) to create, join or participate in a remote teleconferencing or telecollaboration session via ICS 84 and firewall 52. It will be easily perceived that the users of the devices 36, 38, 58, 60, 66, 86, 88, 90, 78, 80 can create, join or participate in a conferencing or collaboration session across multiple sites such as 42, 46, 12 or additional ones. Still referring to FIG. 1 second on-premise remote system 42 includes a firewall 58, a telephony (PSTN) section 98, and an IP section 96. IP section 96 includes an ICS 56, a first computing and display device 58 and a second computing and display device 60. ICS 56 is structurally, and functionally substantially similar to ICS 20, 22, 24 that was presented in hosting system 12 and to ICS 84 of first on-premise system 46. Computing and display devices 58 or 60 are user-operated devices, such as a PC with communication capabilities. Devices 58, 60 are intermittently linked to ICS 56. ICS 56 is connected to IP gateway device 62 which is structurally and functionally substantially similar or equivalent to IP gateway 30 presented in association with hosting system 12 and to IP gateway device 82 of first on-premise system 46. PSTN section 98 of second on-premise remote system 42 includes a telephony switch 64 and optionally a traditional push-button telephony device 66. Device 66 is linkable to telephony switch 64 via a landline telephony network. Device 66 is operated by a user (not shown) for remote voice communications purposes. Device 66 provides the user (not shown) with the option of creating, participating or joining a teleconference session or a telecollaboration session via telephony switch 64, IP gateway 62, ICS 56 and firewall 48. In a similar manner devices 58, 60 are operated by users (not shown) and provide the option to the users (not shown) to create, join or participate in a teleconferencing or telecollaboration session via ICS 56 and firewall 48. It will be easily perceived that the users of the devices 58, 60, 66 could also create, join or participate in a conferencing or collaboration session by connecting to any of the other ICSs, such as 20, 22, 24 or 84. IP Server Manager (ISM) device 99 is communicatively connected to hosting system 12 and to on-premise systems 42 and 46 (links not shown). The function of the ISM 99 is to manage and configure the ICSs of the proposed teleconferencing and telecollaboration system, and their cooperation in bridging and distributing applicative data during events. In a preferred embodiment, each ICS can be connected to one or more clients, as well as to one or more other servers, and can receive and send streams to or from the servers as well as the clients.

Note should be taken that the above described drawing represents a simplified teleconferencing and telecollaboration system and is provided for purposes of easier understanding only. In a realistic environment the hosting system could include a plurality of computing and display devices, a plurality of ICS devices and a plurality of ICC devices. A plurality of telephony devices could be connected and handled by the hosting system via more than one telephony switch and more than one IP gateway. The hosting system could be connected to a plurality of on-premise systems or any other types of systems, such as branch office systems, and the like. The first and second on-premise systems could include a plurality of computing and display devices, a plurality of ICSs, telephony devices and the like. Additional secondary on-premise systems could be connected to hosting system 12, to first on-premise system 46 or to second on-premise system 42. Such additional secondary on-premise systems can, in turn be connected to further on-premise systems. The internal and external connections among the components of the systems 12, 42, 46 could be different. One or more of the systems 12, 42, 46 could include additional components, such as for example, reverse proxies. The computing devices of the hosting system could access various client applications (not shown), such as e-mail, IM, CRM/ERP, calendaring and the like via the ICC, in order to distribute the data there from during teleconferencing or telecollaboration to other conference participants.

Figure 2:
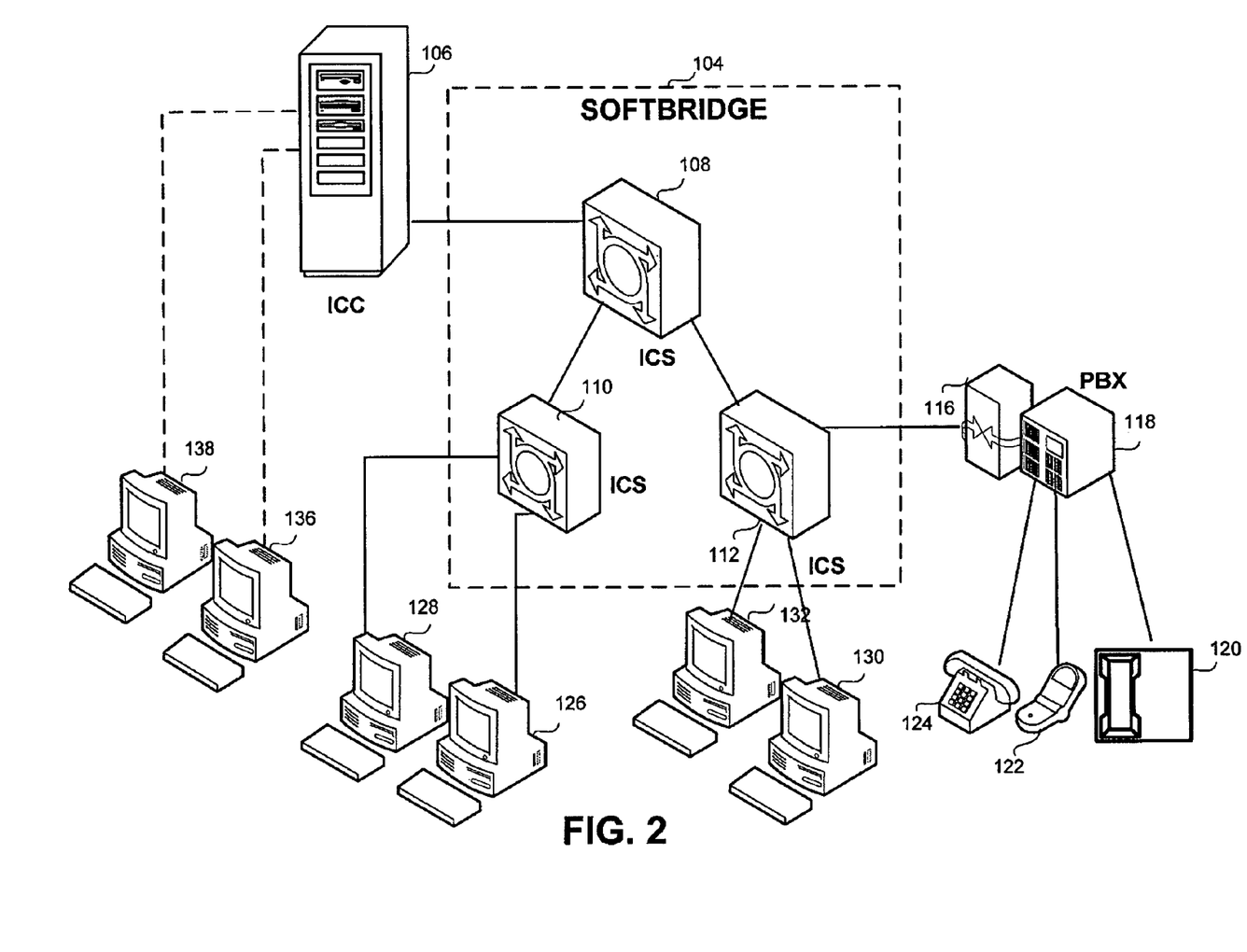
FIG. 2 is a more detailed block diagram of the proposed teleconferencing and telecollaboration system with specific emphasis on the proposed dynamic software bridge, in accordance with a preferred embodiment of the present invention.

Referring now to FIG. 2, in which a group of elements of the proposed teleconferencing and telecollaboration system is shown in an exemplary setting, comprising an IP Communications Center (ICC) 106, several computing and display devices 132, 130, 128, 126, such as user-operated personal computers, and several telephony devices 124, 122, 120, such as Time Division Multiplexing (TDM) phones, cellular phones, or Internet Protocol (IP) phones, analog landline phones; digital landline phones; smart phones with computing, communications or processing capabilities; satellite communications phones or the like. Further elements include a private branch exchange (PBX) 118 (private telephone switchboard), an IP gateway device 116, and a softbridge 104. Softbridge 104 is responsible for bridging and routing integrated Audio, Video or data streams, and includes a main IP communication server (ICS) 108, a second IP ICS 110 and a third ICS 112. Although further ICSs can be connected to the shown structure, exactly one ICS, being ICS 108 in the embodiment of FIG. 2, serves as a main ICS. Each of the other ICSs should be connected to the main ICS, either directly or through connection to additional ICSs. Each ICS can further comprise a networked cluster of servers. ICSs 108, 110, 112 and additional ones, if any, are preferably distributed across a network such as the internet, in order to provide geographically distributed participants with better performance. Telephony devices 120, 122, 124 are telephones operated by users (not shown) for purposes of voice, video, and multi-media communications where the device is provided with the suitable transmission, reception and handling capabilities. Devices 120, 122, 124 are communicatively connected to IP gateway 116 via PBX 118. IP gateway 116 is connected during a teleconference or a telecollaboration session to third ICS 112 of the softbridge 104. Third ICS 112 of softbridge 104 is connected either constantly or during a teleconference or telecollaboration session to first ICS 108 of softbridge 104. First ICS 108 of softbridge 104 is also connected to second ICS 110 of softbridge 104 and to IP Communications Center (ICC) 106. First and second computing and display devices 126, 128 respectively, are communicatively connected to second ICS 110 of softbridge 104. Third and fourth computing and display devices 130, 132 are communicatively connected during a teleconference or telecollaboration session to ICS 112. In a preferred embodiment of the present invention the function of the telephony devices 120, 122, 124 is to enable a user (not shown) to communicate with the system in order to create, join or participate in a teleconferencing session of a telecollaboration session. Each user dials the phone number of the ICS nearest to the user or another preferred ICS on devices 120, 122, 124 and a connection is established between devices 120, 122, 124 and the PBX 118. In accordance with the dialing code, the PBX 118 switches the incoming call to the IP gateway 116. Gateway 116 transform the incoming call signals or call data into data packets of IP format and forwards the data packets via the IP-based data communications network (not shown) to the ICS of choice, being device 112 in the exemplary setting shown in FIG. 2. When creating or connecting to a conference, an IVR component within each ICS (described below) allows a user to setup or join an existing conference based on data available to the ICC 106. ICC 106 handles the call in accordance with the status of the conference and the user's request. If the user attempts to create a conference, then ICC 106 defines a new conference and consequently manages the conference. Based on the response from the ICC 106, ICS 112, then connects the call to a specific conference and receives/distributes audio for this conference via main ICS 108. In the preferred embodiment of the present invention the function of the computing and display devices 126, 128 is to enable a user (not shown) to communicate with the system in order to create, join to or participate in a teleconferencing event or a telecollaboration event. Each user submits a specific request to participate in the conferencing event. Prior to connecting to an event, the application at the user's device tests the connection to each relevant server, and picks the one which responds fastest, typically the nearest one. In the settings shown in FIG. 2, a connection is established between devices 126, 128 and the second ICS 110 of softbridge 104. The user's data is transmitted via the IP-based data communications network (not shown) to the chosen ICS device 110. From ICS 110, the data is transferred through ICS 108 and 112 to all participants of the event. Preferably, streams arriving from the clients or servers connected to an ICS are mixed into a single stream and then transferred by an ICS. Alternatively, streams are sent as is and mixed at the client.

If the user attempts to create a conference then the ICC 106 defines a new conference and consequently manages the conference. Further servers can be added to ICS 108, 110, 112 in order to provide adequate service to participants in a specific event, in accordance with the work load on the ICSs. However, ICS 108, 110, 112 are not limited to being connected to a specific event, but can be active in multiple simultaneous events. In accordance with the requests of one or more conference participants, Data generated by participants of an event can be distributed among one or more participating devices 120, 122, 124, 126, 128 via one or more ICS 108, 110, 112 of softbridge 104. As shown in FIG. 2, the disclosed invention enables the participation of both PC users and telephone users in the same teleconferencing events. Each participant will receive data according to the equipment he or she is using, and in accordance with the resources available for each user. Thus, for example a PC user will receive audio and video data while a phone user will receive only audio data, Similarly, a PC user having a faster connection will receive content in a faster pace than a participant having a slower connection.

The present invention enables one or more participant in a teleconferencing event to connect through a phone, either fixed or mobile, and one or more participants to connect using a PC. Each participant receives the data that can be used by the device he is using. For example, a PC user will receive video and audio data, while a phone participant will receive only audio data. Further, the PC of a user can be bound to a phone of the same user and control it, e.g. issue a mute or unmute command so that voice will be transferred or stopped from being transferred from the phone to the conference.

Figure 3:
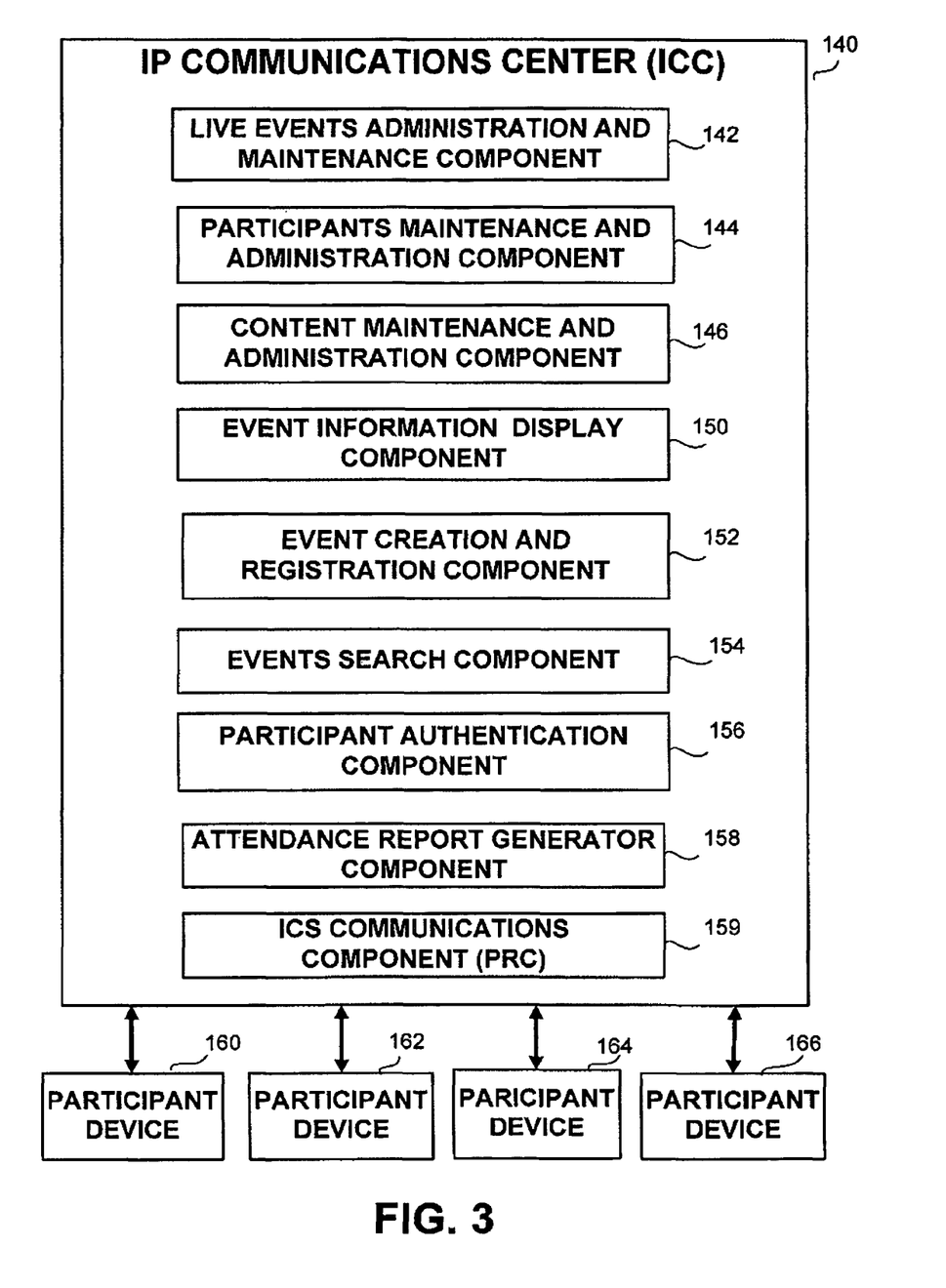
FIG. 3 is a simplified block diagram showing the components of the proposed IP Communications Center (ICC), in accordance with a preferred embodiment of the present invention.

Referring now to FIG. 3, the IP Communications Center (ICC) comprises a group of inter-related software programs installed on a computing platform operating in a data communications network, such as the Internet and more specifically the World Wide Web (WWW or Web). The ICC 140 is a Web-based application that handles the administration and maintenance of live events, such as teleconferencing and various telecollaboration sessions. ICC 140 further administers and manages participants (users) of the events, content of events, and communication servers that are part of the system of the conferencing environment. ICC 140 displays information about events, enables users to create and register events, enables users to view personal data and schedules, enables searching for a specific event, and the like. Users connecting to events using a telephony device are directed to the events using an Interactive Voice Response (IVR) System described below, based on information from ICC 140. ICC 140 can further connect through Lightweight Directory Access Protocol (LDAP) or another protocol to any organizational system, for purposes such as participant authentication. The information generally available for users using a web interface is translated into an Interactive Voice Response (IVR) system so that the users using telephonic interface are provided with audible information. ICC 140 information is preferably managed through Application Programming Interface (API) modules and presented on customers' portal, calendar, or similar applications. A transparent access to ICC functionality allows for customized user experience in several environments. ICC 140 further generates attendance reports for tracking purposes, such as for example, billing. ICC 140 includes a live events administration and maintenance component 142, a participant maintenance and administration component 144, a content administration and maintenance component 146, an event information display component 150, an event creation and registration component 152, an events search component 154, a participant authentication component 156, and an attendance report generator component 158 and an ICS communications component 159 responsible for the communications with the various ICSs. ICS communications component 159 is also referred to as Proxy Remote Controller (PRC). A group of participant devices 160, 162, 164, 166 are linked to ICC 140. Devices 160, 162, 164, 166 could be computing and display devices accessing ICC 140 via a web-interface.

Figure 4:
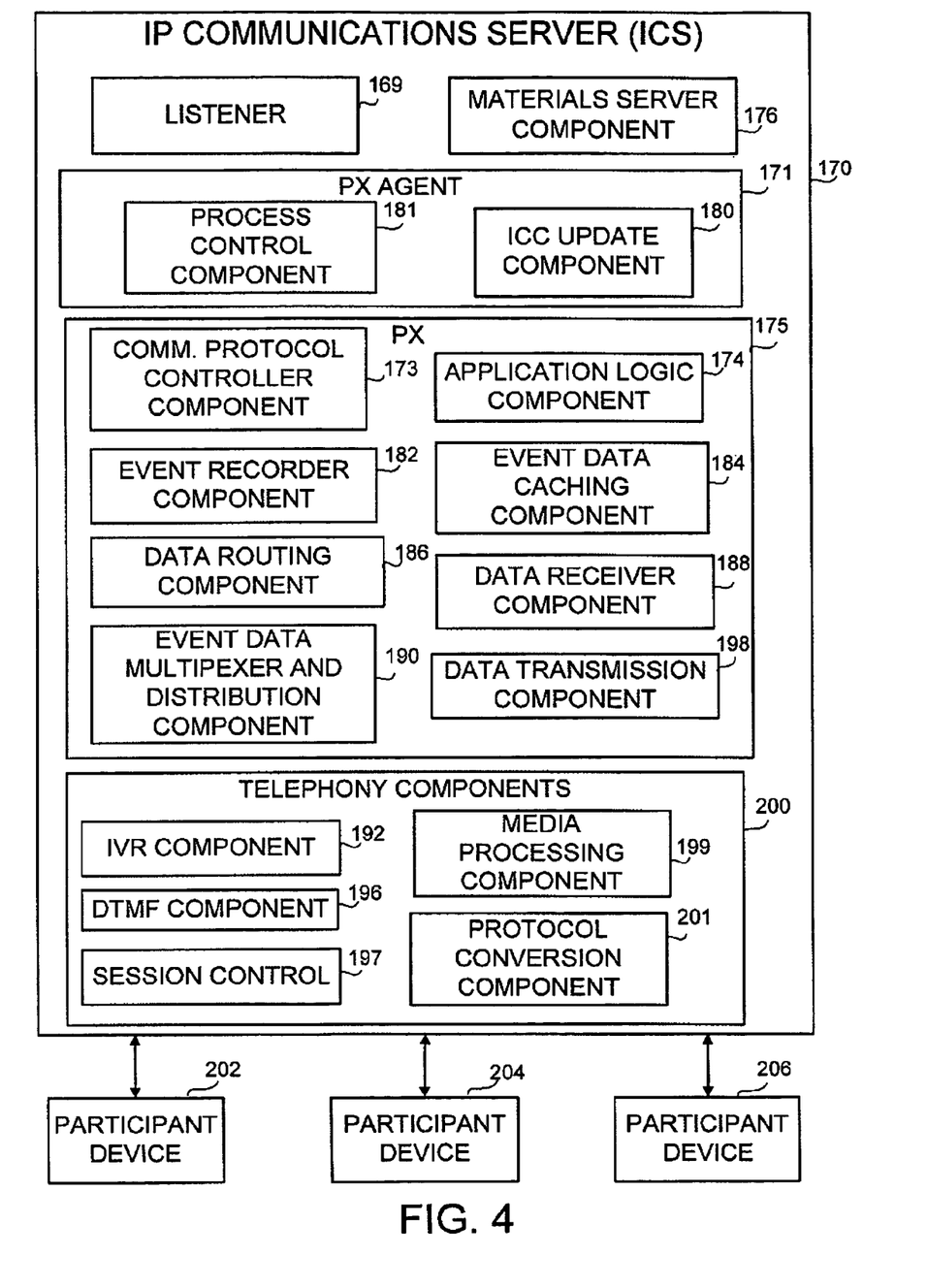
FIG. 4 is a simplified block diagram of the proposed IP communication server (ICS), in accordance with a preferred embodiment of the present invention.

Referring now to FIG. 4, showing the components of an ICS application, such as ICS 108, 110 or 112 of FIG. 2. Since the ICS is an application, the various components are generally processes or other applications or parts thereof, which execute and perform the tasks associated with the ICS. The processes of the ICC and ICS cooperate in the initialization, execution and control of a teleconferencing and telecollaboration system. On the ICC side, the processes include a proxy remote controller (PRC) installed on the ICC platform. The PRC schedules events such as conferences, learning meetings, and others, created on the ICC. On the ICS 170 side, the processes include a listener 169 that acts as a multiplexer and manager for the transfer of incoming connection requests through the ICS. Listener 169 further serves as a single listening point for incoming connections to other processes in ICS 170. Listener 169 preferably communicates with other components via messages associated with the operating system, such as Windows messages. ICS 170 further comprises a materials server component 176 for transferring applicative materials to client devices participating in an event. ICS 170 further comprises a process agent (PxAgent) 171 and a process (PX) 175, each preferably implemented as a collection of processes. PxAgent 171 is responsible for communicating with the PRC installed in the ICC, through ICC update component 180 which receives and sends data from or to the PRC. PxAgent 171 is further responsible for the loading of processes associated with PX 175, in response to commands received from the PRC through ICC update component 180, or from the ISM. PX 175 is a collection of components, preferably implemented as software components such as processes, executables or the like, responsible for distributing all types of data, such as sound, video, application sharing, slides, tests, notes, and the like, during an event. Px 175 is preferably a real-time or near-real-time server which distributes all types of data, such as sound, video, application sharing, slides, tests, notes, and the like, to participants during an event. Px 175 preferably comprises a communication protocol controller component 173 that parses and packs messages received from or sent to other ICSs and/or participant devices; an application logic component 174 that manages the state of the event and executes control commands such as mute/unmute participant; an event recorder component 182 for storing data related to a teleconferencing or telecollaboration event; an event data caching component 184 for caching data or parameters related to an event; a data routing component 186 that routes data to participant devices either directly or through other ICSs; a data receiver component 188 that receives and processes data from other ICSs and participant devices; an event data multiplexer and distribution component 190 for receiving conferencing and collaboration data streams from client devices, selecting and mixing the client device-specific streams into one or more mixed data streams and forwarding the mixed data stream to all client devices and ICSs according to their capability (e.g. telephony devices will receive only audio data while PC devices will also receive video data); and a data transmission component 198. ICS 170 further comprises a collection 200 of telephony support components for supporting IP Audio Conferencing. Telephony components 200, designed to handle and connect telephony devices to the telecollaboration event, include an interactive voice response (IVR) component 192 for enabling voice interaction with a user wishing to create or participate in an event; a Dual Tone Multi-Frequency (DTMF) component 196 for receiving and analyzing tones from a user, in order to make selections when creating or joining an event; a session control component 197 that handles the startup and tear down of incoming calls; a media processing component 199 that processes audio signals received from the telephone devices and performs actions such as gain control noise reduction and speech detection; and a protocol conversion component 201 that packs and unpacks the Standard IP Telephony protocols. A group of participant devices 202, 204, 206 are linked to ICS 170. Devices 202, 204, 206 could be computing and display devices accessing ICS 170 via IP protocol and/or could be telephony devices accessing ICS 170 via telephony interface devices, such as switches, and IP gateway devices. ICS 170 may also include a push server (not shown), which sends to the participants both pre-prepared content used for live events and any pre-recorded materials, such as for example self-paced lessons in an IP-based learning environment. Materials are sent to the participants through server trees, leveraging server network infrastructure and thus keeping bandwidth usage to an absolute minimum.

Figure 5:
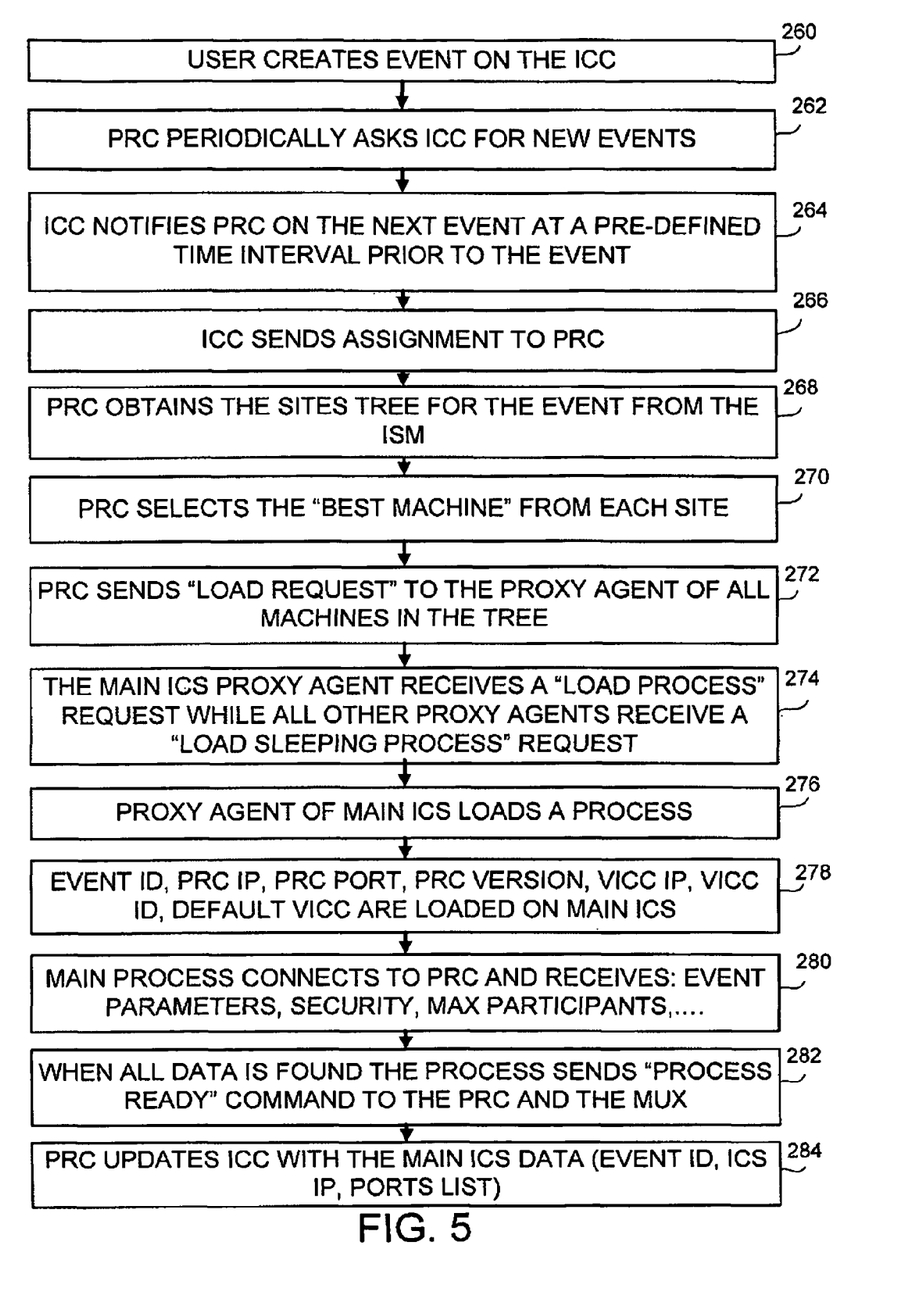
FIG. 5 is a simplified high level flow chart of the loading process, in accordance with a preferred embodiment of the present invention.

Referring now to FIG. 5, showing a flowchart of the main steps associated with initiating an event. At step 260 the user creates (generates) an event, such as a teleconference or tele-collaborative session on the ICC. At step 262 the proxy remote controller (PRC) periodically queries an ICC database (not shown) for new events. In the preferred embodiment of the present invention, the length of the inter-query period is about two seconds. In other preferred embodiments of the invention the length of the period could differ. At step 264 the ICC notifies the PRC about the next event at least a predefined time interval prior to the start of the event. At step 266 the ICC assigns the event to the PRC, and transfers data related to the event time, attendees, subject, materials, or the like, and at step 268 the PRC obtains the network site tree for the event from the ISM. Consequently, at step 270 the PRC selects a specific computing and communications platform with a communication server installed thereon from each network site, in accordance with the comparative workload on the platforms of a network site. In the preferred embodiment of the invention, the selected platform is typically one with the lowest workload while in other preferred embodiments the specific platform could be selected according to other parameters, for example to allow for utilizing the computing resources in an enhance manner. Further, the load balancing can detect a server or a component failure and by reconfiguring the system appropriately provide high availability of the system. At step 272 the PRC sends a "load request" to the PxAgent of all the platforms in the network site tree. At step 274 the PxAgent associated with the main ICS receives a "load active Px now" request while all other PxAgents receive a "load sleeping Px" request.

Still referring to FIG. 5, at step 276 the PxAgent of the main ICS loads a Px process and at step 278 the event ID, PRC IP, PRC port, PRC version, and additional parameters are loaded on the main ICS. At step 280 the Px process of the main ICS connects to the PRC and receives among other data the event parameters, security information, maximum number of participants, and the like. At step 282 when all the required data is available, the process sends a "process ready" command to the PRC and the Mux. Consequently at step 284 the PRC updates the ICC with the main ICS data, such as event ID, ICS IP, and ports list.

In the preferred embodiment of the invention, the client applications include a) a Web browser which is used to access the ICC, browse the ICC catalog, create events through the web user interface (UI), and access live events, b) Participant application which is launched by the web browser when accessing a live event, where these applications connect to the ICS for the live data stream and use HTTP queries to retrieve information from the ICC, such as for example, the event information page that is displayed for every user that enters an event). c) Outlook AddIn that enables users to schedule events from a Microsoft Outlook installed on their desktops. The Outlook AddIn uses internal calls over HTTP to establish the functionality of creating a new event, setting the event attributes and registering users to the event., and d) an optional Communications Gateway for allowing the user to register with new ICCs and access registered ICCs. The event closure procedure is implemented by each Px. The procedure receives from the Px the following parameters: a) ICC URL, b) file name to upload, c) protocol to use (HTTP/HTTPS), d) Proxy URL, and e) username and password. The procedure also uploads the recording and attendance report.

The present invention discloses a distributed apparatus for teleconferencing events, wherein multiple servers cooperate in a single event, thus providing participants with a closer or a faster-responding server, thus lowering the price or improving the response time of the servers. The connection between servers is dynamic, and more servers may be added, i.e. connected to an existing server when the number of participants increases beyond a certain limit. Alternatively, one or more servers can be disconnected when participants leave the event. The present invention enables one or more participant in a teleconferencing event to connect through a phone, either fixed or mobile, and one or more participants to connect using a PC. PC users use the audio input and output of the computers to hear the audio data as heard by a phone user over the phone. Further, the same user may see the video on the computer's display while hearing the audio and speaking over a telephone. Each participant receives the data that can be used by the device he is using. For example, a PC user will receive video and audio data, while a phone participant will receive only audio data. The PC of a user can have control over the phone of the user and issue for example a mute or unmute command to the phone.

It will be appreciated by persons skilled in the art that the present invention is not limited to what has been particularly shown and described hereinabove. Rather the scope of the present invention is defined only by the claims, which follow.

What is claimed is:

1. A cooperative bridging method for cooperatively routing integrated data streams, in a teleconferencing system, during teleconferencing and telecollaboration events, comprising:
   creating a teleconferencing event or a telecollaboration event at a communication center by a participant;
   querying the communication center for new teleconferencing and telecollaboration events by a proxy remote controller;
   notifying the proxy remote controller of new teleconferencing or telecollaboration events by the communication center;
   assigning the new teleconferencing or telecollaboration events to the proxy remote controller by the communication center;
   obtaining, from a server manager, a network site tree of available computing and communications platforms for the new teleconferencing or telecollaboration events, by the proxy remote controller;
   selecting a computing and communications platform from each network site, by the proxy remote controller, using load balancing technology;
   sending a load request to each of at least one proxy agent that each correspond to at least one of the available computing and communications platforms in the network site tree, by the proxy remote controller;
   receiving an active process load request by a proxy agent implemented on a first communication server installed on a main computing and communications platform;
   receiving a sleeping process load request by the at least one proxy agent implemented on at least one second communication server installed on the at least one of the available computing and communications platforms;
   loading an active process of the first communication server on the main computing and communications platform by the proxy agent implemented on the first communication server;
   connecting the active process to the proxy remote controller; and
   sending a process ready command to the proxy remote controller and a multiplexer.

2. The method of claim 1, further comprising:
   loading at least one of: an event identifier, a proxy remote server internet protocol (IP) address, a proxy remote server port, and a proxy remote server version onto the first communication server installed on the main computing and communications platform;
   receiving at least one event parameter, security information, or a maximum number of participants by the active process of the first communication server from the proxy remote controller; and
   updating the at least one second communication server with the event identifier, a communication server IP address, or a ports list for the active process of the first communication server installed on the main computing and communications platform.

\* \* \* \* \*